(12) United States Patent
Campbell

(10) Patent No.: US 6,422,273 B1
(45) Date of Patent: Jul. 23, 2002

(54) EVACUATION SYSTEM FILTER

(76) Inventor: Michael C. Campbell, 1696 Dey Cove Dr., Virginia Beach, VA (US) 23454

( * ) Notice: Subject to any disclaimer, the term of this patent is extended or adjusted under 35 U.S.C. 154(b) by 0 days.

(21) Appl. No.: 09/986,730

(22) Filed: Nov. 9, 2001

(51) Int. Cl.[7] .................................................. B65B 1/04
(52) U.S. Cl. ............................. 141/65; 141/330; 222/5; 222/83.5; 96/135; 96/149
(58) Field of Search ................. 141/8, 65, 329, 141/330, 351, 352, 353, 354, 355, 356, 357, 339, 286; 222/5, 80, 81, 82, 83, 83.5, 85, 88; 96/135, 137, 147, 149

(56) References Cited

U.S. PATENT DOCUMENTS

| | | | |
|---|---|---|---|
| 2,671,528 A | * | 3/1954 | Gross .......................... 96/137 |
| 3,358,883 A | | 12/1967 | Loe |
| 3,828,976 A | | 8/1974 | Sidelinker |
| 3,926,340 A | | 12/1975 | Tygenhof |
| 4,349,054 A | | 9/1982 | Chipman et al. |
| 4,407,341 A | | 10/1983 | Feldt et al. |
| 5,002,593 A | * | 3/1991 | Ichishita et al. .............. 55/337 |
| 5,114,043 A | | 5/1992 | Collins, Jr. |
| 5,163,585 A | | 11/1992 | Campbell |
| 5,181,462 A | | 1/1993 | Isaac |
| 5,265,762 A | | 11/1993 | Campbell et al. |
| 5,271,437 A | | 12/1993 | O'Brien et al. |
| 5,284,997 A | | 2/1994 | Spearman et al. |
| 5,309,956 A | | 5/1994 | Hajma |
| 5,365,982 A | | 11/1994 | O'Neill |
| 5,427,609 A | * | 6/1995 | Zoglman et al. .............. 95/105 |
| 5,992,475 A | | 11/1999 | Campbell |

* cited by examiner

*Primary Examiner*—Steven O. Douglas
(74) *Attorney, Agent, or Firm*—Birch, Stewart, Kolasch & Birch

(57) ABSTRACT

A gaseous-material evacuation system includes a filter assembly (44) with a housing (56) containing filter material (58) with a downstream porous filter member (60) at a downstream side of the filter material. The filter assembly includes a valve (64) with a movable valve member (66) for moving in a direction of gas flow and having a breadth area dimension that is at least as great as that of the downstream surface of the downstream porous filter member. In a preferred embodiment, a spring member (68) presses the movable valve member (66) against the porous filter member (60), thereby stopping gaseous flow, but yields when gaseous materials are driven through the filter at a predetermined pressure. The valve member is mounted in a sub-compartment (72) of the housing, which is of a single-piece housing member.

20 Claims, 1 Drawing Sheet

EVACUATION SYSTEM FILTER

BACKGROUND OF THE INVENTION

This Invention relates generally to gaseous-material evacuation systems and more particularly to such systems having filters for cleaning evacuated gases.

This invention has uses in the area of waste disposal, such as in devices and systems for evacuating aerosol cans, and other containers of pressurized gases and residue contents.

Pressurized aerosol cans, and other pressurized containers, have widespread usage in homes and industry. It has long been recognized that improper disposal of such containers constitutes a safety hazard in that excessive external heat and/or pressure can cause them to explode if they have not been relieved of internal pressure. Similarly, the release of contents, both propellant gases and dangerous residue materials, from such containers often damages the environment.

Due to these hazards, the Environmental Protection Agency (EPA), an agency of the U.S. Government, regulates disposal of pressurized containers as well as their contents for industries. These regulations mandate that certain businesses and industries must puncture all pressurized containers prior to their disposal. Further, these regulations require that certain contents of pressurized containers be captured and disposed of in particular manners. Depending upon the natures of such contents, disposal methods can involve permanent disposal through incineration, landfills or other means; treatment and permanent disposal; treatment and recycling; and treatment and reclamation for a new use. An example of reclamation would be recovering a solvent contained in waste paint for use as a fuel. But, whichever disposal method is used, the EPA requires many industries to relieve the pressure in pressurized containers prior to transporting them for disposal.

In addition to the above requirements of the EPA, many states within the United States and countries outside the United States have requirements similar to, or even stricter than, those of the EPA. For example, California closely regulates release of gases into the atmosphere. In this respect, California considers some propellants used in aerosol cans to be contaminants, particularly when they contain small aerosolized particles of materials, such as insecticides, paints and the like, which were in the aerosol cans.

A number of US Patents to Michael Campbell describe systems for evacuating gaseous materials from aerosol containers and other types of containers, see U.S. Pat. Nos. 5,163,585; 5,265,762; and 5,992,475. Most of these systems involve sealing a wall of an aerosol can on a seat, puncturing the can below the seat, and evacuating the contents of the can into a drum.

A widely used device for piercing pressurized containers is described in U.S. Pat. No. 5,265,762 to Campbell et al. This Campbell et al. patent describes a puncturing device for aerosol containers which includes an elongated tubular housing having male threads at a second end for being screwed into a first, or large, bung-plug hole (bunghole) of an off-the-shelf drum, such as a 15, 30 or 55 gallon drum. An aerosol can to be disposed of is inserted into a first opening at a first end of the cylindrical housing, nozzle-end-first, until a shoulder of the aerosol can engages a sealing shoulder seat in the elongated tubular housing. A puncturing member, as part of a mechanism mounted to the side of the housing, is driven through the housing to create a puncture opening in the aerosol can below the sealing shoulder seat. Propelling gas and residue material are driven from the aerosol can, by pressure of the propellant gas, through the puncture opening and through the second end opening of the housing into the drum. The sealing shoulder seat prevents the propellant gas and residue from retro-movement toward the first end opening of the housing (which opens to the environment) and ensures that these materials go into the drum.

Campbell et al (U.S. Pat. No. 5,265,762) also describes a filter screwed into a second, small, bunghole of the drum for filtering propellant gases escaping from the second bunghole of the drum to the environment for cleaning escaping gaseous vapors of atmosphere-harmful materials.

Other patents which describe devices and systems relating to the system described in Campbell et al (U.S. Pat. No. 5,265,762) include U.S. Pat. No. 3,358,883 to Loe; U.S. Pat. No. 3,828,976 to Sidelinker; 3,926,340 to Tygenhof; U.S. Pat. No. 4,349,054 to Chipman et al; U.S. Pat. No. 4,407,341 to Feldt et al; U.S. Pat. No. 5,114,043 to Collins, Jr.; U.S. Pat. No. 5,181,462 to Isaac; U.S. Pat. No. 5,271,437 to O'Brien et al; U.S. Pat. No. 5,284,997 to Spearman et al; U.S. Pat. No. 5,309,956 to Hajma; and U.S. Pat. No. 5,365,982 to O'Neill.

U.S. Pat. No. 5,992,475 to Campbell discloses a spring-activated check valve at the second end of the tubular wall of the housing with a spring-activated valve poppet positioned at the second end for opening and closing in response to pressure. Basically this check valve opens to allow propellant gases to escape from the punctured aerosol cans into the drum and then closes to prevent retrograde movement of the gases from the drum back through the piercing-device housing once the cans are removed. U.S. Pat. No. 5,181,462 to Issac also describes a similar valve.

Although these prior-art devices prevent retrograde movement of unfiltered gases through the piercing-device housing back to atmosphere, they do not prevent continuous flow of gases thorough the filter from the small bunghole when cans are not being evacuated. Such continuous flow of gaseous materials through the filter to atmosphere, even when cans are not being evacuated, is undesirable because personnel standing near the drum containing evacuated residue and gases are not aware that dangerous gases are being continually released. In this regard, when cans are being evacuated, personnel are aware that dangerous gases are being released and take necessary precautions. However, when cans are not being evacuated, personnel are not aware of such release and do not take precautions. For example, one might smoke a cigarette close to an unused evacuation drum, thereby possibly igniting gases escaping from the drum through the filter. For this reason, it is desirable that evacuation systems become "closed systems" when they are not being actively used for evacuation, and some regulations even promote such "closed systems".

Thus, it is an object of this invention to provide a device for allowing desired easy flow of evacuated gaseous materials through a filter of an evacuation system when the evacuation system is being actively use for evacuation, but for stopping such flow when gaseous materials are not being actively evacuated.

SUMMARY OF THE INVENTION

According to principles of this invention a gaseous-material evacuation system includes a filter assembly with a housing containing filter material with a porous filter member at a downstream side of the filter material. The filter assembly includes a valve with a movable valve member for moving along a path of gas flow and having breadth area dimensions that are at least as great as those of a downstream side of the porous filter member through which pressurized gaseous materials flow. In a preferred embodiment, a coil spring member presses the movable valve member evenly against the porous filter member, thereby stopping gaseous flow, but yields evenly when gaseous materials are driven through the filter by a predetermined pressure. The valve member is mounted in a sub-chamber of the housing containing the filter material, which is a single-piece housing member, and which forms a seat for the movable valve member.

BRIEF DESCRIPTION OF THE DRAWINGS

The invention is described and explained in more detail with reference to the drawings. The described and drawn features can be used individually or in preferred combinations in other embodiments of the invention. The foregoing and other objects, features and advantages of the invention will be apparent from the following more particular description of the invention, as illustrated in the drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Figure 1:
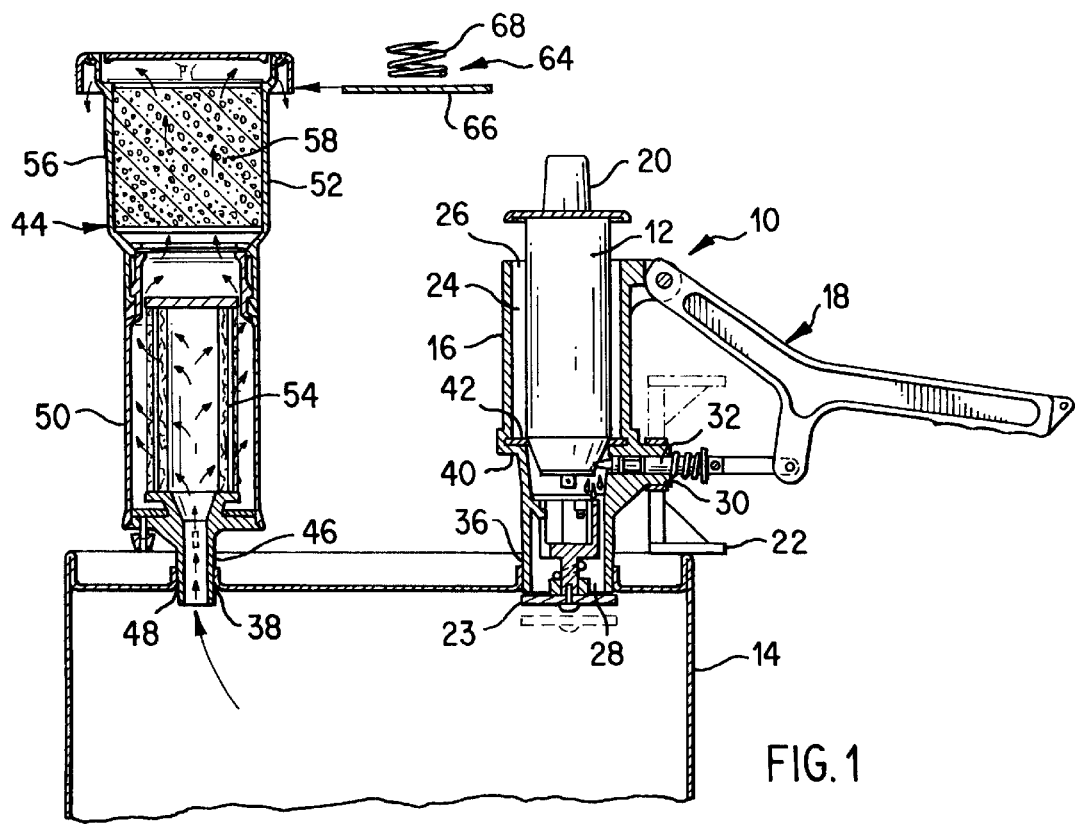
FIG. 1 is a side cross-sectional, exploded, view of an evacuation system including a filter assembly of this invention.

An gas-releasing device 10 for evacuating aerosol cans, punctures a pressurized container (aerosol can) 12 for relieving the pressure therein and for releasing into a collection drum, or receptacle, 14 gases and residue contents. The gas-releasing device 10 generally comprises an elongated housing 16, a puncturing apparatus 18, a force applying apparatus 20, an auxiliary support member 22 and a check valve 23.

The elongated housing 16 defines an elongated cavity 24 with first and second openings 26 and 28 at first and second ends thereof. The elongated housing member 16 has an intermediate aperture 30 through which a puncture pin 32 of the puncturing apparatus 18 extends. The elongated housing 16 further includes a threaded terminus 36 with male threads thereon, the threaded terminus having a size and thread pitch for selectively engaging and disengaging a large female threaded bunghole of a standard U.S. off-the-shelf 5 gal., 20 gal., 30 gal., 55 gal. drum forming the receptacle 14. It should be noted that other containers besides drums could serve as receptacles in similar systems. Further, in other embodiments the threaded terminus 36 can be sized and threaded to fit other collection receptacles. In this regard, standard off-the-shelf drums mentioned above usually have 2 inch filling or spout bungholes with standard threads as well as three quarter inch venting bungholes 38, also with standard threads. Generally, drums meeting standards of other countries also usually have large and small threaded bungholes.

As can also be seen in FIG. 1, the elongated housing 16 defines a shoulder 40 having an internal resilient seal 42 positioned thereon for sealing against the pressurized containers 12 inverted and inserted into the elongated cavity through the first opening 26. The intermediate aperture 30 is between the the resilient seal 42 and the second opening 28.

The puncturing apparatus 18 comprises levers for driving the puncture pin 32 into the elongated cavity 24 and into a neck of the pressurized container 12, below the resilient seal 42.

Pressure in the thusly punctured pressurized container 12 forces gases and residue materials from the container through the second opening 28 of the housing 16 and the check valve 23 into the receptacle 14. The check valve 23 prevents retrograde movement of the gases back up through the gas-releasing device 10 to atmosphere.

A filter assembly 44, which can be part of a kit including the releasing device 10, is mounted in the venting bunghole 38 of the receptacle 14 for filtering escaping propellant gases and collecting gaseous vapors thereof. Propellants and other gases escaping through the filter assembly 44 to atmosphere are thereby filtered and released, with gaseous vapors being collected, prior to the release.

The filter assembly 44 depicted in the drawings is sometimes referred to as a two-stage capsule filter; it comprising a pipe 46 with a male pipe-threaded section 48 for engaging female threads of the venting bunghole 38. A bore of the pipe 46 extends into a housing of a first-stage filter 50 of the filter assembly. On top of the first-stage filter 50 is a detachable second-stage filter 52 that can be resiliently latched to the first-stage filter 15. The description in U.S. Pat. No. 5,284, 997 to Spearman et al. describes such a filter assembly and the teachings of that patent are incorporated herein by reference.

Briefly, the first-stage filter 50 comprises a coalescing filter in which small liquid droplets in a gaseous mixture combine to form larger droplets that are a sufficient size to gravitationally drain away. A coalescing filter member 54 and other filter members serve for this purpose.

The second-stage filter 52 comprises a one-piece second-stage filter housing 56 containing granular carbon 58 held between downstream and upstream porous filter members 60 and 62 which prevent dust from getting into the carbon 58 and help hold the carbon in place. The porous filter members 60 and 62 support the carbon 58 but yet allow easy flow of gases therethrough. As gaseous mixtures flow through the second-stage filter 52, the carbon therein removes hazardous solvents in the gaseous mixture, thereby allowing propellant gases, stripped of hazardous solvents, to discharge into atmosphere. Thus, the carbon second-stage filter 52 removes hazardous solvents from the gaseous mixture by retaining them in pores within the carbon filter, while the coalescing first-stage filter 50 separates droplets to facilitate removal of the hazardous solvents by the carbon filter. The porous filter members 60 and 62 are porous sheet-like members, such as fibrous paper-like filter sheets, having naturally-formed pores therethrough.

In FIG. 1 a valve 64 of this invention is shown exploded outside the second-stage filter housing 56 of the second-stage filter 52. The valve 64 includes a movable valve member 66 and a spring member 68, which is a compressed coiled spring in the shown embodiment.

Figure 2:
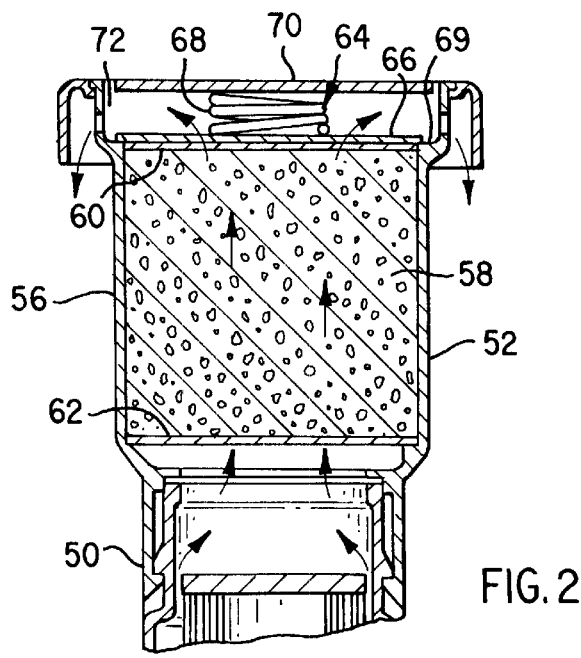
FIG. 2 is an enlarged segmented cross-sectional view of the filter assembly of FIG. 1.

In FIG. 2, the valve 64 is shown mounted in the second-stage filter 52. In this regard, the movable valve member 66 is placed in engagement with both the downstream porous filter member 60 and a housing shoulder 69 (to which the downstream porous filter member 60 is attached), while the coil spring 68 is compressed between the movable valve member 66 and a rain cap 70 attached to the second-stage filter housing 56. The rain cap 70 and housing allow non-hazardous gases to escape while preventing rain from entering the second-stage filter housing 56.

It should be noted that the one-piece second-stage filter housing 56 defines a sub-compartment 72 downstream of the downstream porous filter member 60 and that the valve 64 is mounted in this compartment.

It should also be noted that breadth dimensions of the movable valve member 66 are at least as great as those of a downstream surface of the downstream porous filter member 66 through which gas flows, thereby allowing pressurized gas flow through a valve opening of an area size as great as, or greater, than the size of the downstream porous filter member 60. In this regard, the movable valve member 66 can be even larger than is depicted in FIG. 2 and the second-stage filter housing 56 can have a valve seat against which the movable valve member seals, other than the shoulder 69. However, if there is such a valve seat, it should define an opening substantially as large as or larger than the breadth area of the downstream surface of the downstream porous filter member 60, in the manner as the shoulder 69 does this. In the depicted embodiment the valve seat is both the porous filter member and the shoulder 69, which is of a resinous plastic material sufficiently soft for forming a seal against small pressures. An additional seal could also be added.

Looking now at operation of the valve 64 of this invention, when the puncturing apparatus 18 punctures a pressurized container 12 and a gaseous/residue mixture is released into the receptacle 14, propellant gases apply pressure upwardly through the filter assembly 44 as shown by arrows in FIGS. 1 and 2. This pressure drives the gaseous mixtures through the first-stage filter 50, the carbon 58 of the second-stage filter 52 and the downstream porous filter member 60 against an upstream surface of the movable valve member 66. This pressure is greater than a predetermined amount and, therefore, causes the movable valve member 66 to compress the coil spring 68 and move away from contact with the down-stream porous filter member 60 and the housing shoulder 69; thereby opening pores of the downstream porous filter member 60 and allowing flow of gases to outside atmosphere.

Again, in the depicted embodiment, the movable valve member has a breadth dimension and shape that is substantially as great as the downstream surface of the downstream filter member 60 and it comes into direct contact with the downstream filter member 60. However, the movable valve member could be substantially larger than the downstream surface of the downstream filter member 60, with only a part of the movable valve member contacting the downstream surface of the downstream filter member 60. In the depicted embodiment in which the movable valve member comes into direct contact with the down-stream surface of the downstream porous filter member and in contact with the shoulder 69, there is no need to have an additional valve seat, which thereby saves space and reduces expenses. It should be noted that filter assembly 44, other than the value 64, is an off-the-shelf filter assembly that is presently being manufactured.

In an alternate embodiment, the movable valve member only contacts a valve seat that defines an opening that is substantially as great in area as the area of the downstream surface of the downstream filter member 60, or greater.

In yet another embodiment, the movable valve member only makes direct contact with the downstream porous filter member and comes very close to a valve seat, such as the shoulder 69.

The coil spring 68 has a sufficiently large diameter that the movable valve member 66 moves relatively uniformly away from and toward the downstream porous filter member 60. The spring has a strength, which allows the movable valve member 60 to open in response to pressure from the receptacle 14 from an aerosol can, and which closes the movable valve once most of the gases from the aerosol can have escaped through the filter assembly 44.

The closed evacuation system depicted in FIG. 1 has the advantage that it does not continually emit fumes when it is not being used for evacuating aerosol cans.

The valve of this invention has the benefit of being at least substantially as large as a breadth area of the downstream porous filter member 60 through which gas flows so that it can be easily opened by pressure through the porous filter member 60 and thereby allow easy flow.

Further, even though the valve is relatively large, it uses very little space in the gas-flow direction. In this regard, it can be mounted in the same one-piece second-stage filter housing in which the carbon filter itself is mounted. In fact, it can be mounted in a housing of an existing off-the-shelf filter assembly. Thus, it is not necessary to fabricate or mount an additional pipe on the filter assembly for mounting a check valve.

I claim:

1. An evacuation system comprising:
   a releasing device for releasing pressurized gaseous materials, said releasing device including a check valve for allowing flow of said pressurized gaseous materials away from said releasing device in a first direction, but not allowing it to return in an opposite direction;
   a receptacle communicating with the releasing device and receiving the pressurized gaseous materials;
   a filter assembly comprising a housing for communicating with the receptacle, said housing containing filter material;
   wherein said filter assembly further includes a valve comprising a movable valve member for moving in an opposite direction to gaseous materials flowing through said filter assembly for stopping flow of said pressurized gaseous materials from said receptacle through said filter assembly and for moving in the direction of gaseous materials flowing through said filter assembly for allowing said flow;
   whereby said evacuation system is a closed system.

2. The evacuation system as in claim 1, wherein said movable valve member has a breadth area dimension that is at least substantially as great as a downstream surface of said filter material through which said pressurized gaseous materials flow.

3. The evacuation system as in claim 1 wherein said movable valve member moves toward said filter material to stop flow of pressurized gaseous materials through said filter assembly and away from said filter material to allow said flow, and
   wherein said valve further includes a spring member for urging said movable valve member toward said filter material.

4. The evacuation system as in claim 3 wherein said filter material includes a downstream porous filter member at a downstream side thereof, and wherein said spring member presses said movable valve member into direct contact with said downstream porous filter member for stopping gaseous-material flow therethrough.

5. The evacuation system as in claim 4 wherein said movable valve member responds to pressure of said gaseous materials upstream for moving away from said porous filter member to thereby allow gaseous-material flow through said filter assembly.

6. The evacuation system of claim 5 wherein said housing containing said filter material is a one-piece housing defining a sub-compartment in which the movable valve member is contained.

7. The evacuation system as in claim 1 wherein said filter material includes a downstream porous filter member at a downstream side thereof, and wherein a spring member presses said movable valve member into direct contact with said downstream porous filter member for stopping gaseous-material flow therethrough.

8. The evacuation system as in claim 7 wherein said movable valve member responds to pressure of said gaseous materials upstream for moving away from said porous filter member to thereby allow gaseous-material flow through said filter assembly.

9. The evacuation system as in claim 8 wherein said housing containing said filter material is a one-piece housing defining a sub-compartment in which the movable valve member is contained.

10. The evacuation system as in claim 1 wherein said movable valve member responds to pressure of said gaseous materials upstream for moving away from said filter material to thereby allow gaseous-material flow through said filter assembly.

11. The evacuation system of claim 10 wherein said housing containing said filter material is a one-piece housing defining a sub-compartment in which the movable valve member is contained.

12. The evacuation system of claim 11, wherein a shoulder of said housing forms a valve seat for said movable valve member.

13. A filter assembly comprising a housing for communicating with a source of pressurized gaseous materials, said housing containing filter material, wherein said filter assembly further includes a valve comprising a movable valve member for moving in a first direction along a path of gaseous-material flow through said filter material for stopping flow of said pressurized gas through said filter assembly and for moving in an opposite direction for allowing said gas flow, said movable valve member having a breadth area dimension that is at least substantially as great as a surface area of said filter material having pressurized gas flowing therethrough.

14. The filter assembly of claim 13 wherein said movable valve member moves toward said filter material to stop flow of pressurized gaseous materials through said filter assembly and away from said filter material to allow said flow.

15. The filter assembly of claim 14 wherein said valve further includes a spring member for urging said movable valve member toward said filter material.

16. The filter assembly of claim 15 wherein said filter material includes a downstream porous filter member at a downstream side thereof, and wherein said spring member presses said movable valve member into direct contact with said downstream porous filter member for stopping gaseous-material flow therethrough.

17. The filter assembly of claim 16 wherein said movable valve member responds to pressure of said gaseous materials upstream for moving away from said porous filter member to thereby allow gaseous-material flow through said filter assembly.

18. The filter assembly of claim 17 wherein said housing containing said filter material is a one-piece housing defining a sub-compartment in which the movable valve member is contained.

19. The filter assembly of claim 13 wherein said housing containing said filter material is a one-piece housing defining a sub-compartment in which the movable valve member is contained.

20. The filter assembly of claim 19, wherein a shoulder of said housing forms a valve seat for said movable valve member.

\* \* \* \* \*